Patented Mar. 9, 1943

2,313,650

UNITED STATES PATENT OFFICE 2,313,650

METHOD OF APPLYING COLORED DESIGNS ONTO RUBBER ARTICLES

Justin Loewengart, New York, N. Y., assignor to Transcontinental Rubber Corporation, New York, N. Y., a corporation of New York No Drawing. Application October 24, 1940, Serial No. 362,619

1 Claim. (Cl. 41—24)

This invention relates to a novel method of applying colored designs or ornaments onto rubber goods, for instance rubber shoes. The invention also relates to the novel articles manufactured by my improved process.

Heretofore rubber goods have been provided with colored designs and ornaments by cutting or punching the latter out of suitable superposed sheets of colored unvulcanized rubber compounds.

The punched-out portions of the rubber sheet are glued onto the rubber goods, and thereafter the goods together with the colored designs or ornaments applied thereto are vulcanized.

The rubber sheets are prepared in calenders and are stapled by interposing between the individual rubber sheets sheets of paper to prevent the rubber sheets from adhering to each other.

Alternatively, the rubber sheets may be provided with a layer of talcum powder on both surfaces thereof.

Then, the ornaments are punched out from the multilayer rubber sheet by means of a special punching knife.

Hence, it will be obvious that for every design and ornament a different punching knife is required. Furthermore, it is very difficult to punch out designs or ornaments with sharp points or corners from the said multilayer rubber sheets. The pressure of the punch causes the unvulcanized rubber sheets to emerge at their edges and to adhere to each other. Hence, it will be seen that the prior processes have many drawbacks, one of which being that only certain designs without sharp corners can be used.

It is, accordingly, an object of the invention to provide a novel process of applying colored designs and ornaments to rubber goods by applying for instance spreading or spraying viscous rubber or latex compounds in conformity with the designs or ornaments onto the rubber goods.

It is another object of the invention to obviate the use of punches for cutting out the colored designs and ornaments from colored rubber sheets used heretofore.

It is still an object of the invention to provide an improved process that makes it possible to apply colored designs and ornaments of any shape or configuration onto rubber goods.

In accordance with my novel process the designs and ornaments are applied by spreading a suitable colored viscous latex or rubber compound onto the goods to be decorated. The colored latex or rubber compound may be applied by hand or mechanically by using for instance a spatula or a stencil, or a spraying device. The rubber compound is applied when the goods to be decorated are still in the nonvulcanized state. If the goods are produced from latex compounds the application of the ornaments can only be effected after the goods are dried. By varying the viscosity of the colored latex or rubber compounds the plasticity of the designs or ornaments may be varied. Thus, the most varied ornamental effects can be obtained.

A preferred colored latex compound is given in the table below, the parts being taken by weight of the dry substance.

| | Parts |
|---|---|
| Latex | 100 |
| Sulphur | 2 |
| Zinc oxide | 2 |
| Titanium oxide | 5 |
| Accelerator | 1 |
| Dyestuff | 2 |

After the viscous latex or rubber compound ornaments are applied onto the goods, the same are vulcanized whereafter the ornament or design will adhere permanently to the goods.

The advantages of my novel method are obvious.

The designs and ornaments can be cheaply applied and do not require as much labor as the methods known heretofore. Furthermore, the use of expensive punches is obviated. Besides, any design or ornament may be easily applied without the technical limitation which was inherent with the prior processes.

It will be obvious to those skilled in the art that many variations in the process disclosed as well as in the procedure of treatment may be made which fall within the scope of this invention and without departing from the spirit thereof.

I claim:

A method for embellishing rubber articles consisting in molding the unvulcanized article into its final form, shaping upon the same haut-relief ornaments of a predetermined configuration from a viscous rubber compound, drying the article, vulcanizing the same in the absence of pressure, and preserving hereby the original form of the ornaments.

JUSTIN LOEWENGART.